No. 773,281. Patented October 25, 1904.

UNITED STATES PATENT OFFICE.

WILLIS EUGENE EVERETTE, OF TACOMA, WASHINGTON.

CONTAINER FOR RADIUM AND ALLIED COMPOUNDS.

SPECIFICATION forming part of Letters Patent No. 773,281, dated October 25, 1904.

Application filed April 9, 1904. Serial No. 202,357. (No model.)

*To all whom it may concern:*

Be it known that I, WILLIS EUGENE EVERETTE, a citizen of the United States, and a resident of Tacoma, in the county of Pierce and State of Washington, have invented certain new and useful Improvements in Containers for Radium and Allied Compounds, of which the following is a specification.

One of the dangers and disadvantages attending the use of radio-active substances or substances containing radium is the difficulty of preventing the constant radiation of the rays which are perpetually emanating from such compounds. Inasmuch as these rays find little or no resistance from the ordinary so-called "solid" substances and insulating materials, serious accidents have occurred in carrying such compounds in the hand, in the pocket, or otherwise where their effect may be felt by the person carrying them or using them, and when such compounds are to be transported considerable distances there is quite a loss of radio-active energy due to the lack of proper insulation.

The object of my invention is to provide a container for such substances, which will effectually resist the tendency of emanations from radium and all highly-radio-energized elements and their compounds to pass through the material of the container. To accomplish this object, I make a solution of chromic acid in gelatin with ammonia and then make a hard dough with sodium chlorid, preferably by the following method: I heat the chromic acid until it becomes liquefied and drop it into concentrated ammonia, by which I mean, preferably, hydrate of ammonia 26° Baumé and of 0.910 specific gravity. I then heat white gelatin with or without water to a condition of soft jelly. I prefer that class of gelatin which dissolves by dry heat; but when such is not available I use that which requires the addition of hot water to dissolve it. In such case I evaporate the solution to a sticky, pasty, jelly-like mass before adding the other ingredients. I add to this the chromate of ammonia, stirring thoroughly and evaporating thoroughly until the mass becomes a stiff paste. To this paste I add as much pulverized anhydrous sodium chlorid as the paste can take up, forming a hard dough, and press this dough into box form, preferably cylindrical, by means of a die or otherwise, so as to form two telescoping cylinders, which are closed at the outer end and one fitting closely over the other. All of this operation so far described should be carried on in a room lighted only by a red or other light which is free from violet rays, in order to avoid the actinic effect of such rays. When the cylinders or boxes are completed, I expose them to the rays of an iron-carbid arc-light and afterward to sunlight. Thereby the gelatinous compound becomes insoluble in water and absorbs actinic and chemical properties from the violet and ultra-violet rays of the iron-carbid arc-light and from the actinic rays of the sun. Another method of bringing about the same result can be applied whereby the materials are available by obtaining a block of solid native crystallized sodium chlorid and cutting it into the desired hollow shape and then immersing it in the paste before described, made of chromate of ammonia and gelatin, followed by the exposure above referred to of sunlight and the iron-carbid arc-light. Unless the surface of the gelatinous chromate-of-ammonia paste which fills the pores up and surrounds the sodium-chlorid container is rendered or covered with an insoluble film, the sodium chlorid will deliquesce when exposed to moisture, and therefore become destroyed.

As a specific example of the process of forming this container, I will give the following: Take five-tenths of one per cent. of pulverized chemically-pure chromic acid, one per cent. of hydrate of ammonia, 26° Baumé s. p. 0.910, ten per cent. of gelatin reduced to a jelly-like mass, and eighty-eight and a half per cent. of pulverized sodium chlorid. Dissolve the chromic acid, ammonia, and gelatin together in a dark room under red light until thoroughly assimilated. Add the sodium chlorid, gradually stirring in well until it becomes a thick and tough dough-like mass. This occurs before all the sodium chlorid has been taken up and the balance must be worked in with hammer and pressure. Press the mixture into the desired shape and expose it to strong sunlight for six hours. Then expose it to the rays of an iron-carbid arc-light for six hours, at the end of which time the container will be ready for use. A container thus made can be now used with complete safety for the reception and transportation of radium and any of its allied radio-active elements or compounds, and it will be found that substantially no emanations will escape therefrom, either in handling, transportation, or storage.

I claim—

A container for radium and allied compounds which consists of an insoluble body of gelatinous chromate of ammonia, containing sodium chlorid.

WILLIS EUGENE EVERETTE.

Witnesses:
 ANNA H. VAN HORENBERG,
 W. P. PREBLE, JR.